Patented Aug. 4, 1925.

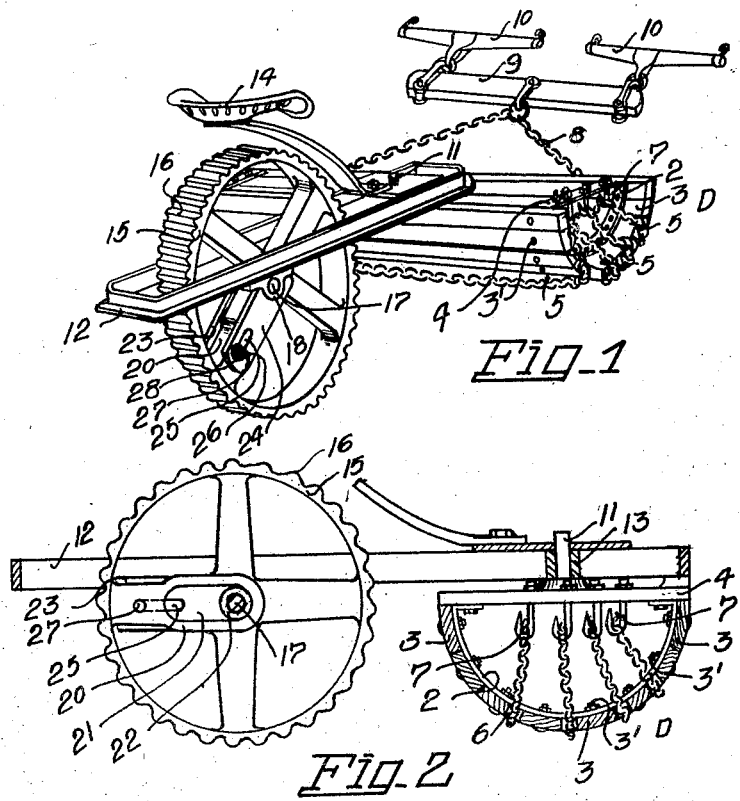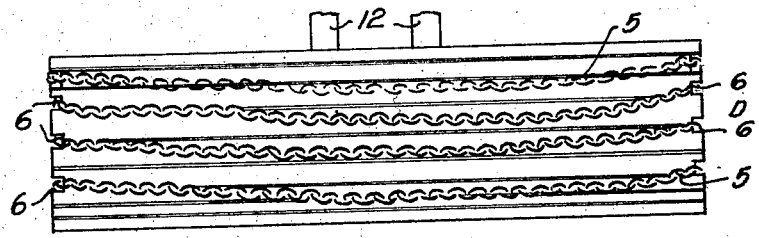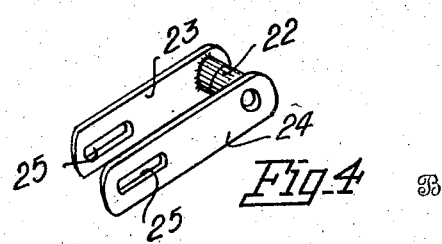

1,548,395

UNITED STATES PATENT OFFICE.

GROVE S. TARBELL, OF COLVILLE, WASHINGTON, ASSIGNOR OF ONE-HALF TO LOUIS STRAUSS, OF COLVILLE, WASHINGTON.

PULVERIZER.

Application filed August 29, 1923. Serial No. 659,982.

*To all whom it may concern:*

Be it known that I, GROVE S. TARBELL, a citizen of the United States, residing at Colville, in Stevens County and State of Washington, have invented certain new and useful Improvements in Pulverizers, of which the following is a specification.

My present invention relates to improvements in Pulverizers adapted for use as an agricultural implement in the cultivation of the soil and particularly designed to follow the harrow for the purpose of finely dividing the sods formed by the harrow. The implement is also serviceable in breaking up the crust of the soil-surface and mulching the soil to render the latter capable of retaining moisture. To this end the invention contemplates a wheeled, horse drawn implement comprising a drag-drum to be dragged over the soil and provided with wear devices for tearing and loosening the plants and crushing and pulverizing the soil surface. And the invention further comprises means in combination with the drag-drum whereby the latter may be oscillated as it advances to bring into use the different wear devices thereon for the purpose of more effectively performing the functions of the implement and prolonging the durability of the wear devices. The invention may be said to reside in certain novel combinations and arrangements of parts involving the drag-drum and its adjustable supporting wheel as will hereinafter be more fully set forth and claimed. In the accompanying drawings I have illustrated one complete example of the physical embodiment of my invention wherein the parts are combined and arranged in accordance with the best mode I have thus far devised for the practical application of the principles of my invention.

Figure 1 is a perspective view from the rear of an implement embodying my invention.

Figure 2 is a partial side elevation and partial longitudinal vertical sectional view of the implement with the draft devices omitted.

Figure 3 is a bottom plan view of the drag-drum, showing the wear chains thereon.

Figure 4 is a perspective view of an adjustable bearing hub and connections for the wheel by means of which the latter may be adapted for eccentric movement.

In carrying out my invention as illustrated in the drawings I utilize a drag-drum D to be dragged over the surface of the soil with its longitudinal axis at right angles to the direction of travel. For convenience in construction and use this drum is preferably of semi-cylindrical shape in cross section and comprises a suitable number of transversely disposed metal hoops or bands 2 against the exterior curved faces of which the wood slats or bars 3 are placed and secured as by bolts 3'. The bars may or may not be laid with their edges close together to form a closed structure as shown, but the drag-drum is of sufficient weight to insure its proper position on the soil surface when in use. A suitable number of cross bars or braces 4 are utilized to render the drag-drum a rigid structure. On the exterior of the drum are carried a series of wear devices here indicated as chains 5, but it will be understood that wire cables or similar devices may be substituted for the chains if desired. These chains are arranged in parallelism and extend longitudinally from end to end of the drum, and at the respective ends the drum is provided with complementary notches 6 in the bars 3 through which the chains are turned and the ends of the chains are then anchored to suspending hooks as 7 which are firmly fixed in the ends of the drum as to the cross bars or braces 4. The links of the chains provide convenient means for suspending them from the pairs of hooks and the chains are adjusted as to their length in proportion to the desired relation of the chains to the drum. Thus the chains may be taut and lie in close relation to the exterior face of the drum, or they may be slackened slightly, as indicated in Fig. 3 to drag beneath the drum. The formation of the chains in links it will be apparent provides for a flexible wear element, or a series of such elements, which are very effective in tearing out the plants and pulverizing the soil or sod, as the drum with the wear elements beneath it is dragged over the surface of the soil.

Horse power is utilized for pulling the implement and the horses may be attached to the draft device comprising the equalizing chain 8 attached at the front of the drum, the equalizing draft bar 9, and single trees 10, as illustrated in Fig. 1.

At the approximate longitudinal center of the upper portion of the drum a king pin 11 is provided which projects vertically therefrom and to which the rectangular metal frame 12 is coupled in suitable manner as by the head 13, and a seat 14 for the driver of the implement is supported on the frame.

The implement frame is supported on a single traction wheel 15 which is preferably provided with a corrugated tread surface 16, and the wheel as seen in Fig. 1 is located within the frame at the rear of the drag-drum B. The axle 17 of the wheel is supported in bearing blocks 18 attached at the underside of the main frame bars and the wheel is movable as to its bearings with relation to the axle from a concentric position to a more or less eccentric position. Thus one of the spokes as 20 of the wheel is fashioned with a radially extending bearing slot 21 for the accommodation of an adjustable bearing hub 22 which is formed as an integral or rigid part with the plates 23 and 24. These plates are arranged in parallelism and project angularly from the hub and at their free ends they are provided with longitudinally extending slots 25. The hub or sleeve 22 is made in sections so that the sections can be inserted from opposite sides into the spoke-slot 23 at the center of the wheel, and the axle 17 is then passed through the bearing blocks 18 and the sectional hub. The two slotted plates 23 and 24 lie at the exterior and opposite sides of the slotted spoke and a securing bolt 26 is passed through the alined slots 25 of the plates and a bolt 27 in the spoke 20, and a nut 28 secures the plates to the spoke. Thus it will be apparent that the wheel may be slipped into eccentric position and the two plates and spoke bolted together to retain the wheel in adjusted position. When in eccentric position and rotating it will be obvious that the frame, at its rear end is caused to rise and fall with the movement of the wheel and this movement of the frame results in a rocking or oscillating movement of the rounded drum with relation to the ground surface. As the drum advances and is thus oscillated the several wear devices or chains on the exterior of the drum are brought into positive and frictional engagement with the ground surface. In this manner the several chains are successively and alternately brought into use and are thus more effective in tearing the surface of the soil than would be a single chain, and the weight of the drum is utilized for crushing or breaking and pulverizing the soil. The chains are effectually prevented from displacement by their connection with the notched ends of the drum, and may be replaced or readjusted with facility and convenience because of the simplicity of their suspension from the hooks 7 of the drum.

It will be understood of course that the wheel may be utilized in its concentric position when desired, and the eccentricity of the wheel may be increased or decreased to impart a different oscillation or rocking movement to the drum-drag.

Changes and alterations may be made in the illustrated exemplification of the implement within the scope of the appended claims without departing from the spirit of my invention. For instance in hitching to the equalizing chain 8 the coupling may be made a little to one side of the center in order that the machine may be drawn over the ground at an angle to the direction of movement. By oscillating the implement it will be apparent that stones, roots, etc., are permitted to pass more freely under the implement than would be the case with the wheel secured in concentric position. When being used to level the field some dirt or soil is pushed ahead of the implement as it progresses, the amount depending upon the weight of the machine, condition of the soil etc., and in this manner the high places are cut down and the low places filled. As a result of the leveling the soil is packed fairly even under the surface while the wear devices mulch it on top.

Having thus fully described my invention, what I claim as new and desire to secure by Letters Patent is—

In an implement as described the combination with a drag-drum comprising a semi-cylindrical member and composed of transverse braces and longitudinal slats, of a series of spaced chains extending longitudinally of said slats and notches in some of the slats for said chains, and suspending hooks carried by transverse braces for suspending the ends of said chains.

In testimony whereof I affix my signature.

GROVE S. TARBELL.